April 13, 1948.  S. SHALER  2,439,698
LEVEL
Filed April 11, 1946
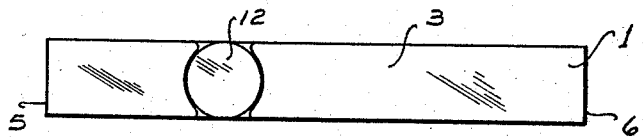
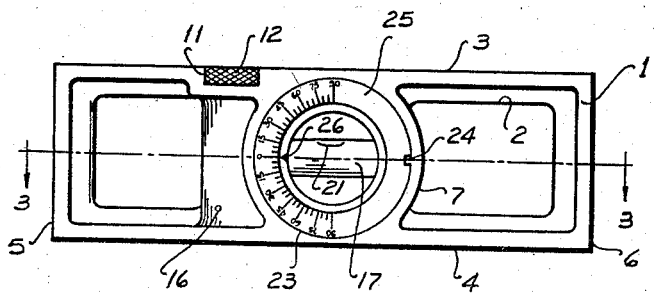
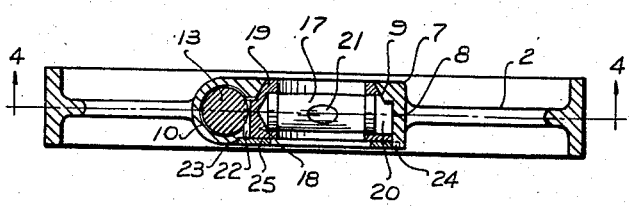
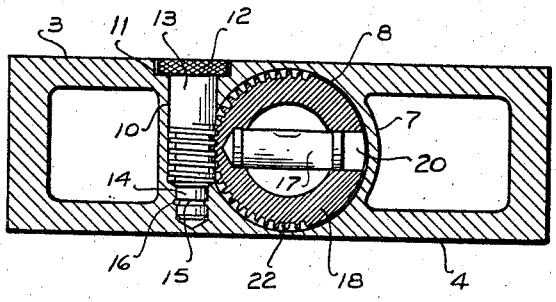
INVENTOR
SAUL SHALER
BY
ATTORNEY Patented Apr. 13, 1948

2,439,698

UNITED STATES PATENT OFFICE 2,439,698

LEVEL

Saul Shaler, Jackson Heights, Long Island, N. Y.

Application April 11, 1946, Serial No. 661,425

2 Claims. (Cl. 33—214)

This invention is a level of the type wherein a frame with straight edges is provided with a spirit level adapted to be adjusted to predetermined angles with respect to the straight edges of the frame and wherein the adjustment of the spirit level is accomplished through the rotation of an adjusting screw. Levels of this general character have heretofore been made and the object of the present invention is to economize in the manufacture of such levels, and to improve the mounting of the spirit level in the frame so as to eliminate lost motion and inaccuracies which result from wear.

In carrying out this invention, the spirit level, i. e., the glass which contains the liquid and in which the bubble is formed, is mounted within a carrier and this carrier has a frusto conical hub mounted in a correspondingly shaped seat in the frame of the level so as to have a relatively long, self centering bearing therewith. This carrier is held to its seat in a manner to automatically take up wear and thus preclude lost motion even after long periods of use, and will be accurate even though subjected to rough usage.

The invention comprises other features all of which cooperate to produce a particularly sturdy construction, economical to manufacture, but nevertheless rugged and accurate.

The accompanying drawing illustrates one practical embodiment of the invention, but the construction therein shown is to be understood as illustrative, only, and not as defining the limits of the invention.

Figure 1 is a front elevation of a level embodying the present invention.

Figure 2 is a plan view of the level.

Figure 3 is a section on the line 3—3 of Figure 2.

Figure 4 is a section on the line 4—4 of Figure 3.

The level illustrated in the drawings, comprises a frame 1 here shown as a die casting, skeletonized and provided with reinforcing ribs 2 to straighten it. The frame has opposite parallel edges 3 and 4 and parallel ends 5 and 6. Midway of its length the frame is provided with an integrally cast central portion 7 having a cylindrical chamber 8 extending inwardly from one face of the level and communicating with a frusto conical seat 9 which is coaxial with said chamber. At one side of the cylindrical chamber 8 and substantially tangent thereto is a cylindrical hole 10, one end of which extends to the edge 3. Adjacent this end the hole 10 is enlarged, as shown at 11, to receive a knurled head 12 of an adjusting worm screw 13. The lower end of the hole 10 is reduced in size to receive the reduced end 14 of this worm screw which is circumferentially grooved at 15, so that a pin 16 may be passed through the level to enter the groove 15 and lock the adjusting worm screw in place. The head 12 of the screw is preferably substantially equal to or slightly less than the thickness of the frame 1, as shown in Figure 2, so that its opposite sides may be engaged by the fingers of the operator's hand to rotate the screw but said screw will nevertheless be so protected that it will not be inadvertently turned by engagement with extraneous objects.

The bubble glass 17 of the spirit level is mounted within a carrier 18 having a cylindrical part provided at its back with a frusto conical hub 19. This cylindrical portion and its hub are of tubular form so that the carrier is in the form of an annulus. The annulus has a diametrically disposed bore 20 in which the bubble glass 17 is rigidly fitted, so that the bubble 21 in said glass may be observed through the central opening of the carrier.

The cylindrical portion of the carrier 18 is adapted to be received into the cylindrical chamber 8 of the frame, with the frusto conical hub of such carrier in engagement with the seat 9 of the frame and these two complementary frusto parts form the bearing in which the carrier is adapted for rotation.

The periphery of the carrier is toothed as shown at 22 and these teeth are adapted to mesh with the teeth of the adjusting worm screw 13. The teeth may be extended entirely around the carrier although, in practice, this is not necessary as little more than 180 degrees will be sufficient for all practical purposes. The open end of the cylindrical chamber 8 of the frame is rabbeted at 23 with the rabbet formed entirely around the circumference of this chamber except at one point indicated at 24 in Figures 2 and 3 and at this point the rabbet is interrupted to form a tooth.

The rabbet 23 is adapted to receive an annular dial plate 25 and said rabbet is of such depth that, when the plate is forced into the rabbet, it will press the frusto conical hub of the carrier firmly to the seat 9 of the frame. For example, the base of the rabbet may be slightly below the outer face of the carrier, so that, when the dial plate is pressed into the rabbet, it engages with the carrier before it engages with the base of the rabbet. In practice, the dial plate 25, which is relatively thin, is forced against the carrier and then secured against the base of the rabbet by staking it, spot welding it, by prick-punch or otherwise, although it may, if desired, have a forced fit. It may be thus placed under sufficient axial stress to hold the carrier firmly to a seat in a manner to automatically take up wear but permit this carrier to be rotated by the adjusting worm screw 13.

The inner circumference of the passage through the carrier is somewhat less than the inner cirsumference of the dial annulus 25 and consequently a portion of the inner margin of the carrier will be exposed to view through the dial annulus, as shown in Figures 1 and 3. On this exposed portion is placed an indicator pointer 26 adapted to cooperate with an angle scale carried by the dial annulus 25, as shown in Figure 1. The outer periphery of the annulus 25 is notched to fit about the tooth 24 of the frame and this insures accurate positioning of the annulus and the dial scale thereon with respect to the pointer 26.

The parts which enter into the level of this invention are well adapted for quantity production, particularly by well known die casting and stamping methods. They may thus be manufactured in quantity without requiring fine tolerances and they may thereupon be quickly and easily assembled without any complicated assembly problems. All these parts are, however, sturdy and when in assembled relation will not be apt to come apart or get loose. This invention thus supplies a relatively cheap yet thoroughly durable and reliable level.

In the accompanying drawings, the frame has been shown relatively short, but in practice it may be made of any desired length and may have additionally combined with it any other of the adjuncts which are frequently associated with levels.

The foregoing detailed description sets forth the invention in its preferred practical form, but the invention is to be understood as fully commensurate with the appended claims.

Having thus fully described the invention, what I claim as new and desire to secure by Letters Patent is:

1. A level comprising a frame having therein a circular chamber provided with a frusto conical seat, a spirit level carrier positioned within said chamber and having a frusto conical hub coaxial with and rotatably bearing against said seat, a graduated dial annulus overlying the face of the carrier distant from said seat and secured to the frame to hold the frusto conical hub of the carrier in engagement with said seat, the periphery of the carrier being toothed, an adjusting worm screw mounted to turn in the frame and meshing with the teeth of the carrier to rotate the latter, and an indicating pointer on the carrier cooperating with the graduations on the dial annulus.

2. A level comprising a frame having therein a circular chamber provided with a frusto conical seat, a spirit level carrier positioned within said chamber and having a frusto conical hub coaxial with and rotatably bearing against said seat, a graduated dial annulus overlying the face of the carrier distant from said seat and secured to the frame under axial stress to hold the frusto conical hub of the carrier in engagement with said seat, the periphery of the carrier being toothed, an adjusting worm screw mounted to turn in the frame and meshing with the teeth of the carrier to rotate the latter, and an indicating pointer on the carrier cooperating with the graduations on the dial annulus.

SAUL SHALER.

REFERENCES CITED

The following references are of record in the file of this patent:

UNITED STATES PATENTS

| Number | Name | Date |
|---|---|---|
| 935,807 | Oswald | Oct. 5, 1909 |
| 963,959 | Stratton | July 12, 1910 |
| 1,215,035 | Kocisko | Feb. 6, 1917 |
| 1,822,740 | Loeser et al. | Sept. 8, 1913 |